Aug. 30, 1932.  E. K. JAYCOX  1,874,537
MANUFACTURE OF VACUUM DEVICES
Filed Oct. 23, 1930
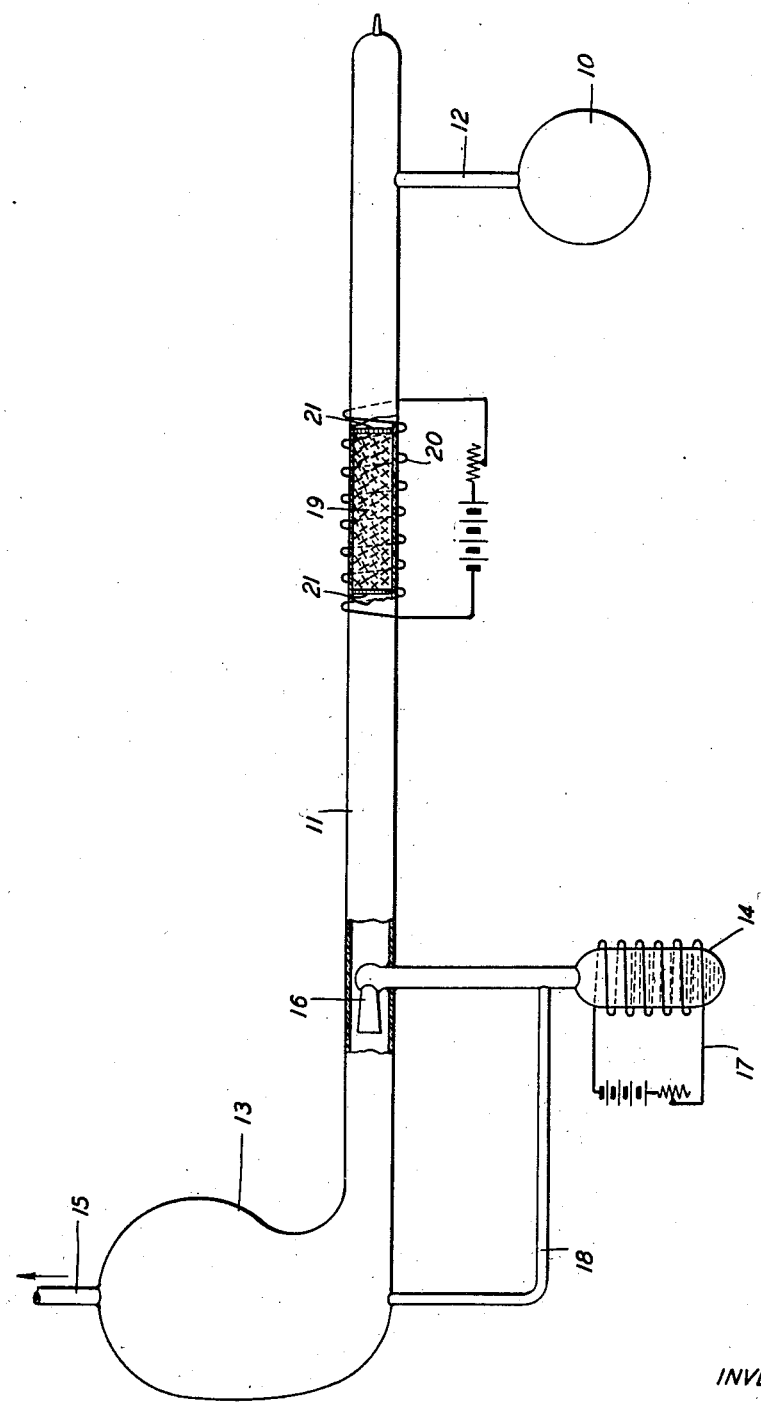
INVENTOR
E. K. JAYCOX
BY
Walter C. Kiesel
ATTORNEY Patented Aug. 30, 1932

1,874,537

UNITED STATES PATENT OFFICE

EDWIN K. JAYCOX, OF HARRINGTON PARK, NEW JERSEY, ASSIGNOR TO BELL TELEPHONE LABORATORIES, INCORPORATED, OF NEW YORK, N. Y., A CORPORATION OF NEW YORK

MANUFACTURE OF VACUUM DEVICES

Application filed October 23, 1930. Serial No. 490,645.

This invention relates to the manufacture of vacuum devices and more particularly to the evacuation of electron discharge devices to low pressures.

In the exhausting of vessels and particularly vessels of electron discharge devices to low pressures it is common practice at the present time to employ a mercury diffusion pump in conjunction with a liquid air trap. The mercury diffusion pump is usually connected, by a suitable conduit, to the electron discharge devices to be exhausted and a liquid air trap is inserted in the conduit between the pump and the devices to condense vapors and gases and to prevent any back flow of gases or vapors from the pump to the devices being pumped. Although a reasonably high degree of vacuum may be obtained with this arrangement, the relatively high cost of liquid air and mercury makes the use of these materials objectionable from an economic standpoint.

An object of this invention is to decrease the cost of exhausting discharge devices to low pressures.

In accordance with one embodiment of this invention a diffusion pump employing an organic oil, such for example as butyl benzyl phthalate, is used in conjunction with a trap containing a gas absorbent medium, such as baked charcoal or alumina. The pump is connected by a conduit in the usual manner to the discharge device to be exhausted and the trap is inserted in the conduit between the pump and the device and serves to prevent the flow of oil vapor from the pump to the device. When the charcoal is cooled the trap also absorbs gases and vapors removed from the device and thus materially aids in reducing the pressure and insures a high degree of vacuum.

The invention will be more clearly understood from the following detailed description with reference to the accompanying drawing which shows diagrammatically an evacuating system constructed in accordance with this invention.

Referring now to the drawing, a vessel 10 to be evacuated, such for example as the enclosing vessel of an electric discharge device, is connected to an elongated conduit 11 by a tubulation 12 which is sealed to the vessel 10. The conduit 11 is connected with a diffusion pump comprising a condensing chamber 13, in which the conduit 11 terminates, and an oil reservoir 14. The condensing chamber 13 may be connected to a mechanical vacuum pump (not shown) by a conduit 15. The reservoir 14 is associated with a pump or aspirator nozzle 16 disposed in the conduit 11 and directed toward the condensing chamber 13, and is heated by an electric heater 17. An oil return conduit 18 is interposed between the condensing chamber 13 and the reservoir 14. A trap containing an absorbent material, such as charcoal or alumina 19 is inserted in the conduit 11 between the diffusion pump and the vessel 10. The absorbent material 19, which is heated in vacuo by an electric heater 20 and then allowed to cool to room temperatures is held within the conduit 11 by two mesh retainers 21 which prevent the absorbent material 19 from being drawn into the diffusion pump or passing into the vessel 10. The trap prevents the passage of oil vapors from the pump into the vessel being exhausted, and also absorbs some of the gases withdrawn from the tube, thereby further improving the vacuum in the vessel.

Although an oil diffusion pump is employed in the specific arrangement illustrated in the drawing, it is to be understood that this invention comprehends the use of any pumping means wherein oil is employed as the puming medium. Substantially any oil, or similar medium, having a relatively low vapor pressure may be utilized in the evacuating system in accordance with this invention. Very satisfactory results may be obtained with such organic oils as butyl benzyl phthalate, n-di butyl phthalate, and di-benzyl phthalate, used in conjunction with a trap embodying baked charcoal or alumina.

In the evacuating system of this invention the use of cooling traps, such as liquid air traps, is obviated and the apparatus required for the exhausting of vessels to low pressures is simplified. Furthermore, the elimination of mercury and liquid air, particularly the latter, materially decreases the cost of evacuating vessels.

What is claimed is:

1. An evacuating system comprising a vessel adapted to be exhausted, a diffusion pump having a condensing chamber, a reservoir connected to said chamber containing an organic oil having a relatively low vapor pressure serving as a pumping medium, a return conduit forming a communicating passage between said chamber and said reservoir, a conduit connecting said vessel and said pump, and a trap filling the cross-section of said conduit, interposed between said vessel and said pump including a porous gas absorbing material for absorbing oil vapors from said pump and certain of the gases withdrawn from said vessel while allowing passage of other gases withdrawn from said vessel.

2. An evacuating apparatus comprising a diffusion pump having a condensing chamber, a reservoir connected to said chamber, containing butyl benzyl phthalate as the pumping medium, a return conduit connecting said chamber and said reservoir, an elongated conduit extending from said condensing chamber and adapted to be connected to a closed vessel which is to be exhausted, a trap in said elongated conduit including a plurality of spaced mesh retainers extending substantially across the elongated conduit, a mass of charcoal substantially filling the conduit between said mesh retainers, and means for heating said charcoal.

In witness whereof, I hereunto subscribe my name this 20th day of October, 1930.

EDWIN K. JAYCOX.